(12) United States Patent
Latschbacher et al.

(10) Patent No.: US 7,080,577 B2
(45) Date of Patent: Jul. 25, 2006

(54) MARKER TAG FOR TREE TRUNKS AND AN APPLICATOR HAMMER FOR THE APPLICATION OF SAME TO TREE TRUNKS

(75) Inventors: Klaus Latschbacher, Kronstorg (AT); Johann Huber, Kronstorf (AT)

(73) Assignee: Latschbacher GmbH, Kronstorf (AT)

( * ) Notice: Subject to any disclaimer, the term of this patent is extended or adjusted under 35 U.S.C. 154(b) by 0 days.

(21) Appl. No.: 10/978,425

(22) Filed: Nov. 2, 2004

(65) Prior Publication Data

US 2005/0274229 A1    Dec. 15, 2005

(30) Foreign Application Priority Data

Jun. 15, 2004    (EP) .................................. 04013943

(51) Int. Cl.
*B25D 1/00*    (2006.01)
(52) U.S. Cl. ................... 81/23; 81/20; 81/24; 227/147; 227/152
(58) Field of Classification Search .................... 81/20, 81/23, 24; 227/147, 152
See application file for complete search history.

(56) References Cited

U.S. PATENT DOCUMENTS

| | | | |
|---|---|---|---|
| 3,589,584 A * | 6/1971 | Ohlsson et al. ............... | 227/10 |
| 3,673,717 A * | 7/1972 | Latschbacher ............... | 40/668 |
| 4,147,168 A * | 4/1979 | Hayes et al. ................ | 606/117 |
| 4,696,119 A * | 9/1987 | Howe et al. .................. | 40/301 |
| 5,943,804 A | 8/1999 | Linquist et al. | |
| 6,783,048 B1 * | 8/2004 | Powell ....................... | 227/113 |

FOREIGN PATENT DOCUMENTS

| | | |
|---|---|---|
| DE | 36 40 039 A | 5/1988 |
| DE | 90 00 653 U | 3/1990 |
| EP | 1 286 325 A | 2/2003 |

* cited by examiner

*Primary Examiner*—Lee D. Wilson
*Assistant Examiner*—Shantese McDonald
(74) *Attorney, Agent, or Firm*—Browdy and Neimark, PLLC

(57) ABSTRACT

A marker tag for tree trunks is provided with a flat element bearing indicia adapted to clip onto an applicator hammer. A nail extends perpendicularly through the flat element and is able to slide in a passage opening in the flat element preferably subject to the action of a clamping force and only able to be slid on application of a force. After driving the nail provided with the marker tag into a living tree trunk the trunk continues to increase in diameter and accordingly pushes the marker tag along the nail so that after a certain number of years it is stripped off and drops to the ground.

10 Claims, 2 Drawing Sheets

MARKER TAG FOR TREE TRUNKS AND AN APPLICATOR HAMMER FOR THE APPLICATION OF SAME TO TREE TRUNKS

BACKGROUND OF THE INVENTION

The invention relates to a marker tag for tree trunks comprising a flat element bearing indicia and having holding means for clipping on an applicator hammer, and furthermore such an applicator hammer for the application of such marker tags to tree trunks.

THE PRIOR ART

Such marker tags are for example disclosed in the British patent publication 2,075,464 A, the European patent publication EP-A-1 246 152 or the European patent publication EP-A 1 286 325, the last named specification also illustrating and describing an applicator hammer for the attachment of the marker tags on wood. The marker tags in this case bear optical, magnetic or electronic indicia or codes in order to mark the respective tree trunk or wood. Known marker tag possess integrally formed teeth or spurs which bite into the tree trunks when using the hammer and thus anchor the tag. The marker tag may then later only be removed from the tree trunks, more particularly after a certain period of growth, with a considerable degree of mechanical effort and normally, the marker tags only become detached during later processing using the appropriate chemical treatment.

SHORT SUMMARY OF THE INVENTION

One object of the present invention is to provide a marker tag which automatically detaches itself after a number years from the tree trunk and furthermore an applicator hammer for the attachment of such a marker tag to living tree trunks.

In order to achieve these and/or other objects appearing from the present specification, claims and drawings, in the present invention a marker tag for tree trunks comprises a flat element with indicia and with holding means for clipping on an applicator hammer, wherein a nail extends perpendicularly through the flat element, said nail being able to slide in a passage opening in the flat element.

Furthermore the invention provides an applicator hammer for applying such a marker tag to tree trunks, comprising a hammer handle and a hammer head, wherein the hammer head possesses a driver face adapted for engagement with the flat element of a marker tag and behind which driver face there extends a peripheral groove into which the holding means of the marker tag may snap and wherein a receiving slot for the nail extends perpendicularly to the driver face of the marker tag from the driver face as far as an abutment face for the rear end face of the nail.

The advantages of the design in accordance with the invention are more particularly that owing to the anchoring of the nail in the tree trunks the marker tag is automatically pushed along the nail during the growth of the tree in an outward direction with the increase in diameter of the trunk so that finally it drops off. Since the increase in the trunk diameter may generally be approximately estimated, the depth of penetration of the nail may be employed to determine when the marker tag drips off. The depth of penetration may for example be set by adjustments on the applicator hammer. The applicator hammer makes it possible for the marker tag, after removal from a magazine using the hammer, to be secured by means of the hammer together with the nail in a simple manner on the tree trunks.

The features of the invention recited in the dependent claims relate to advantageous developments and improvements in the marker tag as defined in claims 1 and the applicator hammer defined in claim 9.

In accordance with an advantageous feature of the invention the nail has at least part of its length between a starting position of the flat element and the end portion remote from the front point provided with protrusions, with peripheral grooves or with helical splines in order to render possible the sliding of the flat element along the nail or, respectively, to produce a force opposing the sliding movement.

The holding force of the holding means on the applicator hammer is in this case set to be less than the force for sliding the nail through the passage opening so that the applicator hammer may be removed from the marker tag after application without displacement of the marker tag along the nail.

In order to hold the flat element elastically on the nail slits extend outward from the edge of the passage opening so that elastic lugs are formed to clamp onto the nail, the protrusions on it or the like. The rear end portion of the nail widens in diameter like a cone to prevent deformation on driving home the nail and furthermore to increase the holding force on the flat element along the rear part thereof.

The flat element preferably possesses integrally formed spacer elements on its flat side facing away from the holding to prevent damage of the holding means, which are not so robust, on stacking in a magazine and more particularly on removal of a marker tag by the applicator hammer.

The holding means are preferably in the form of three or four hook-like holding members adapted to snap into an annular groove in the applicator hammer.

The length of the receiving slot in the applicator hammer is preferably equal to the free length of the nail after hammering it home and in accordance with a convenient design of the invention is adjustable.

The driver face of the applicator hammer is preferably the front side of a driver disk provided with the peripheral groove for the holding means to snap into.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
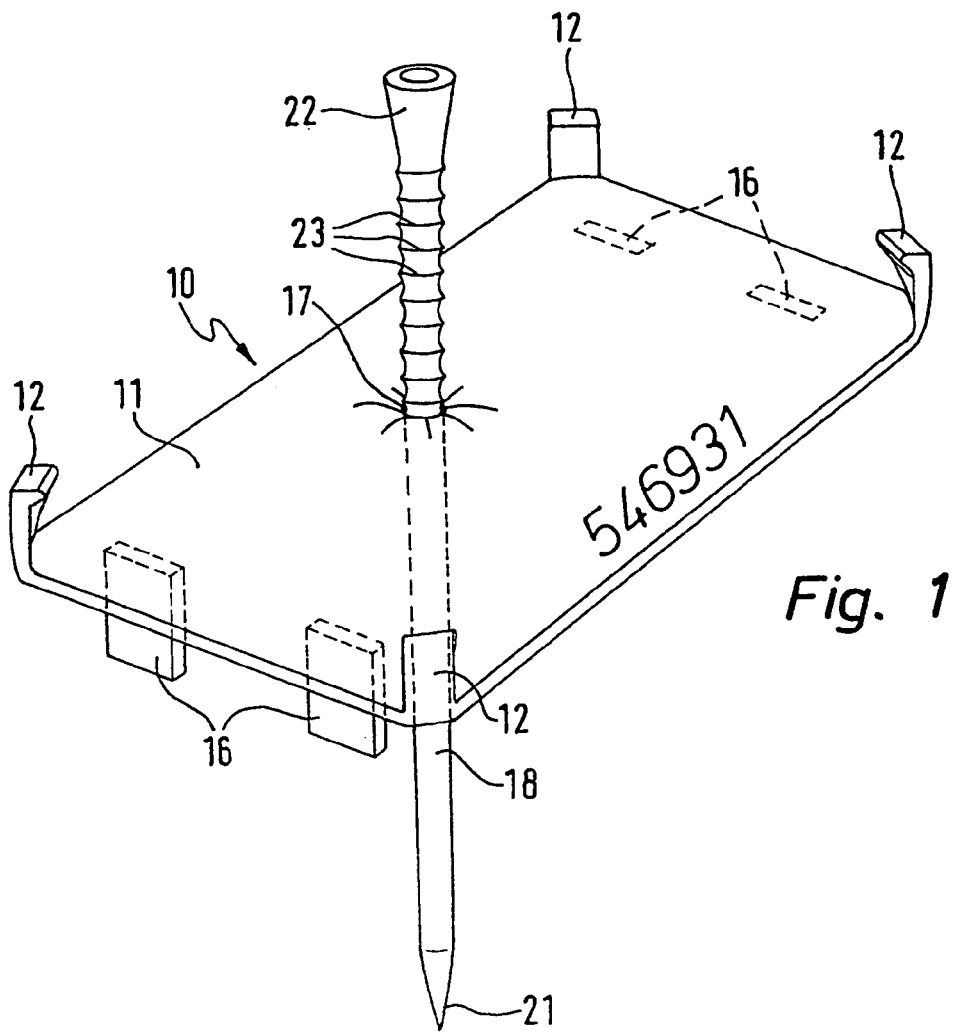
FIG. 1 is a perspective representation of a marker tag provided with a nail.

The marker tag 10 illustrated in FIG. 1 is produced in the form of a plastic injection molding and essentially comprises a rectangular tabular flat element 11, which at its four corners is provided with attachment spurs 12, projecting to one side, which are normally termed pick up spurs or hooks. These attachment spurs 12 have detent projections at their free end portions and such projections are directed toward one another, that is to say toward the middle of the marker tag and on fitting to the head 13 of an applicator hammer 14

(see FIGS. 3 and 4) fit into a peripheral groove 15 in the hammer head 13 to be held therein.

On the opposite side in the flat element 11 four integrally formed spacer elements 16 are provided, which project from the flat element 11 and are slightly longer than the attachment spurs 12. Accordingly during stacking in a magazine (not illustrated) they protect the attachment spurs. The number and the form of the spacer elements may be varied. In the case of a simplified design they may also be omitted.

In a manner which is not illustrated but is customary in the art, the flat element may have through slots for placement in a row on U-shaped members for stack magazines 2.

The flat element 11 may, instead of the rectangular configuration, in principle have a different shape. Such different designs of the flat element are illustrated in the initially mentioned British patent publication 2,075,464 A.

Figure 2:
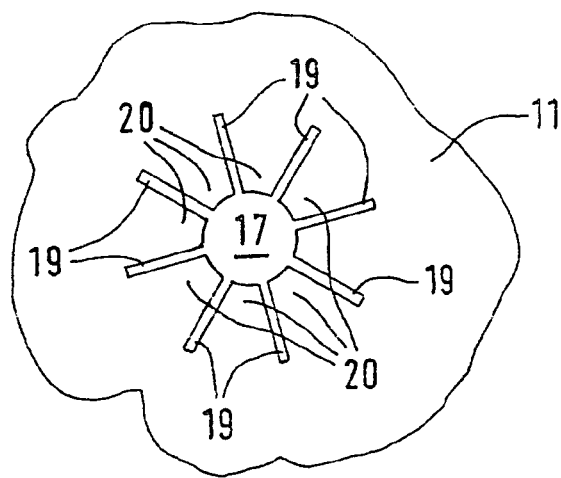
FIG. 2 shows a detail of the passage opening in the flat element of the marker tag for the nail on a larger scale.

The flat element 11 possesses a through hole 17, represented in more detail in FIG. 2, to receive a nail 18. From the edge of the through opening 17 slits 19 extend radially outward so that elastic lugs 20 are formed which make elastic engagement with the nail 18. In a simpler design it is possible to have a plain through hole through which the nail runs with or without friction.

The nail 18 possesses a point 21 at one end and a conical nail head 22 at the opposite end. The nail head 22 is such that the nail widens in diameter toward the end. The peripheral face of the nail 18 is provided with peripheral ribs or grooves 23 which may be in the form of striations or helical ridges. They serve to hold the nail 18 more firmly on the flat element 11 so that such flat element 11 may only be moved on the nail 18 with a fair degree of force. The nail 18 is driven into a growing tree trunk by means of the applicator hammer 14 in a manner to be described in more detail until the marker tag 10 has its spacer elements 16 in engagement with the tree trunk. The nail 18 is in this case firmly anchored on the trunk. When the tree grows and increases in diameter the outer face of the trunk will force the marker tag 10 along the nail 18 until after a few years the marker tag 10 is pushed off the nail completely and drops onto the ground. The farther the nail is driven into the and accordingly the shorter the protruding length of the nail is, the shorter the time in which the marker tag remains on the trunk. By varying the depth of driving the nail into the wood and the protruding length the time may be set in which the marker tag is held on the trunk. The peripheral grooves 23 need be only provided along the path of displacement of the flat element 11 along the nail 18 and furthermore such ridges or rib may be absent.

In the case of the working example in accordance with FIG. 1 the flat element 11 is provided with indicia in the form of a six digit number as a code. Instead of such numerical indicia a bar code or some other optically readable code or a magnetic or electronic code could be employed as in the initially mentioned European A-1 246 152.

Figure 3:
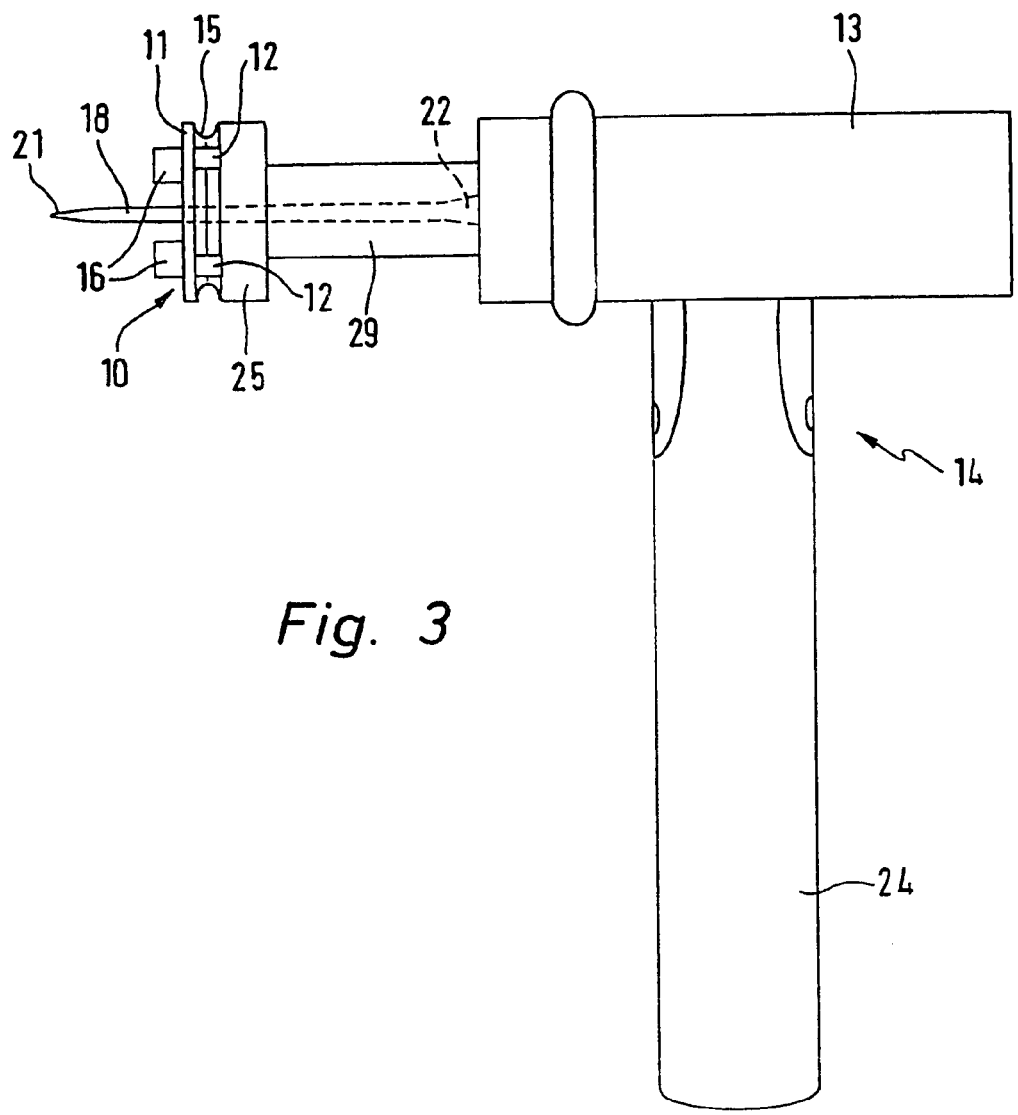
FIG. 3 shows an applicator hammer with a marker tag mounted thereon as seen from the side.
Figure 4:
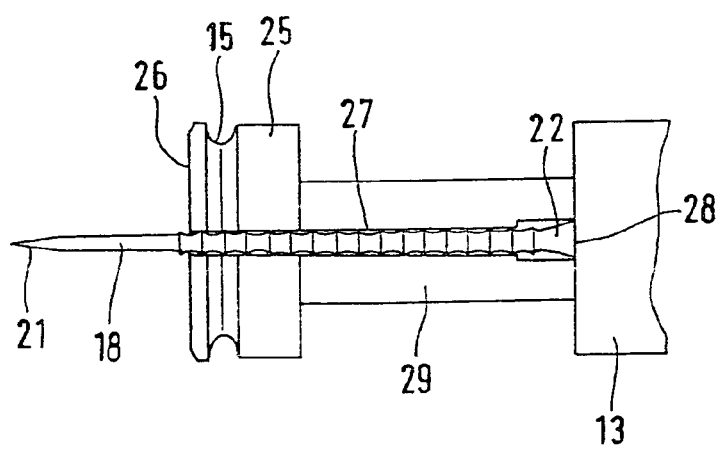
FIG. 4 shows a detail of the driver portion of the applicator hammer as seen from above.

The applicator hammer 14 illustrated in FIGS. 3 and 4 has a handle 24 on which the head 13 of the hammer is attached. The hammer head 13 has a driver disk 25, peripherally grooved at 15, on one end, such disk 25 engaging at its free side 26 (the driver face) the flat element 11 of a marker tag 10 clipped into position on the hammer. From this free end face 26 there perpendicularly extends a receiving slot 27 for the rear portion of the nail 18 as far as an abutment face 28 for the nail head 22. For the insertion of the nail head 22 the receiving slot 27 is made wider in the portion in front of the engagement face 28.

The receiving slot 27 extends downward into the hammer head 13. Accordingly such receiving slot 27 is visible in the view from above in accordance with FIG. 4, During use firstly a nail 18 is slipped into the receiving slot 27 as in FIG. 4. Then the hammer head 13 armed with the nail 18 is so moved into a marker tag magazine that the nail 18 is fitted into the through hole 17 in a marker tag 10. When the driver disk 25 reaches the top marker tag 10 the tag will be locked in-place owing to engagement of the attachment spur 12 with the peripheral groove 15. Now a nail 18 provided with the marker tag 10 can be driven home into a tree trunk normally so far that the marker tag 10 engages the tree trunk. The hammer head is then disengaged from the nail and the marker tag 10. The hammer head 13 may have means for cooperation with the marker tag magazine in order to ensure that the marker tags 10 are fitted of the hammer head 13 at the correct angle. For instance, the driver disk 25 may have a projection for cooperation with a slot in the marker tag magazine.

In the working example the through hole 17 is arranged eccentrically in the flat element 11. In principle a central or other arrangement of the through hole 17 is possible.

In the illustrated working example the receiving slot 27 has a predetermined length so that the depth of driving in can only be varied if nails of different length are employed. However, the length of the protruding portion of the nail 18 will remain constant. In the case of a more adjustable design it is possible for example to have a cylindrical part 29 provided with the driver disk 25, such cylindrical part being provided with the receiving slot, which is able to be slid and fixed in various different positions in the remaining part of the hammer head. Moreover it is possible for the engagement face 28 for the nail head 22 to be made adjustable by having a set screw or the like.

The invention claimed is:

1. A marker tag for tree trunks comprising a flat element with indicia and with holding means for clipping on an applicator hammer, wherein a nail extends perpendicularly through the flat element, said nail being able to slide in a through opening in the flat element, wherein the nail is held with a clamping effect in the through opening and may only be slid on the application of force.

2. The marker tag as set forth in claim 1, wherein the nail, at least along part of the length thereof between an initial engaged position of the nail and the flat element and a rear end portion remote from the initial engaged position is provided with striations or peripheral grooves or with helical grooves.

3. The marker tag as set forth in claim 1, wherein the holding force of the holding means is less than the force involved on sliding the nail through the through opening.

4. The marker tag as set forth in claim 1, wherein a rear end portion of the nail has a diameter widening like a cone.

5. The marker tag as set forth in claim 1, wherein the flat element possesses integrally formed spacer elements on a flat side thereof facing away from the holding means.

6. A marker tag for tree trunks comprising a flat element with indicia and with holding means for clipping on an applicator hammer, wherein a nail extends perpendicularly through the flat element, said nail being able to slide in a through opening in the flat element, wherein slits extend from an edge of the through opening in an outward direction so that elastic lugs result.

7. A marker tag for tree trunks comprising a flat element with indicia and with holding means for clipping on an applicator hammer, wherein a nail extends perpendicularly through the flat element, said nail being able to slide in a through opening in the flat element, wherein the holding means are designed in the form of three or four holding members adapted to snap like hooks into an annular groove of the applicator hammer, preferably four holding members being arranged on four corners of the flat element which is substantially rectangular.

8. An applicator hammer for applying a marker tag to tree trunks, comprising a hammer handle and a hammer head, wherein the hammer head possesses a driver face adapted for engagement with a flat element of the marker tag, wherein behind the driver face there is a peripheral groove into which holding means of the marker tag may snap and wherein a receiving slot for a nail engaged through the marker tag extends perpendicularly to the driver face of the marker tag from the driver face as far as an abutment face for the rear end face of the nail.

9. The applicator hammer as set forth in claim 8, wherein the length of the receiving slot is less than the length of the nail to be driven into the tree trunk.

10. The applicator hammer as set forth in claim 8, wherein the driver face is arranged on the front face of a driver disk provided with said peripheral groove serving for receiving the holding means by same snapping into place.

* * * * *